US012429271B2

(12) United States Patent
Zheng

(10) Patent No.: US 12,429,271 B2
(45) Date of Patent: Sep. 30, 2025

(54) ICE MAKING MACHINE WITH ICE CUBE WEIGHING FUNCTION

(71) Applicant: SMYZE Intelligence Technology (Shanghai) Co., Ltd., Shanghai (CN)

(72) Inventor: Fang Zheng, Shanghai (CN)

(73) Assignee: SMYZE Intelligence Technology (Shanghai) Co., Ltd., Shanghai (CN)

( * ) Notice: Subject to any disclaimer, the term of this patent is extended or adjusted under 35 U.S.C. 154(b) by 87 days.

(21) Appl. No.: 18/617,526

(22) Filed: Mar. 26, 2024

(65) Prior Publication Data

US 2025/0085042 A1  Mar. 13, 2025

(30) Foreign Application Priority Data

Sep. 13, 2023 (CN) .......................... 202311178597.4

(51) Int. Cl.
F25C 5/20 (2018.01)
(52) U.S. Cl.
CPC ............ *F25C 5/24* (2018.01); *F25C 2500/04* (2013.01); *F25C 2600/04* (2013.01); *F25C 2700/02* (2013.01)

(58) Field of Classification Search
CPC .... F25C 5/24; F25C 2500/04; F25C 2600/04; F25C 2700/02; F25C 5/182; F25C 1/04; F25C 5/00; Y02P 60/85; G01G 19/52
See application file for complete search history.

(56) References Cited

U.S. PATENT DOCUMENTS 5,630,310 A * 5/1997 Chadwell ............. G01G 13/026
53/502

\* cited by examiner

*Primary Examiner* — Jerry-Daryl Fletcher
*Assistant Examiner* — Dario Antonio Deleon
(74) *Attorney, Agent, or Firm* — IPro, PLLC

(57) ABSTRACT

An ice making machine has an ice cube weighing function. The machine has an ice discharging control mechanism below an ice outlet. The ice discharging control mechanism is electrically connected to an electromagnetic valve and has a receiving funnel and a scale. A side wall of the receiving funnel is connected to the scale. A top inlet of a cavity of the receiving funnel is directly below the ice outlet, and an ice falling controller has at a bottom outlet of the cavity of the receiving funnel and is configured to control falling of ice cubes in the receiving funnel. The ice falling controller is electrically connected to the scale. The ice discharging control mechanism is below the ice outlet, the scale can weigh the ice cubes falling into the receiving funnel.

6 Claims, 3 Drawing Sheets

ICE MAKING MACHINE WITH ICE CUBE WEIGHING FUNCTION

TECHNICAL FIELD

The present application relates to the technical field of ice making machines, and more specifically, to an ice making machine with an ice weighing function.

BACKGROUND

With the popularity of cold drinks, ice making machines are widely used in shopping malls as equipment for making ice cubes. Ice making machines are a kind of refrigeration mechanical equipment which allows liquid water to pass through a refrigeration system, causing heat exchange between the liquid water and a refrigerant in the refrigeration system, thereby causing the liquid water to form solid ice through cooling.

Existing ice making machines that are generally used in the field of unmanned retail control opening and closing of solenoid valves at ice outlets depending on time (single variable) to control falling of ice. In actual practice, there are the following problems: the weight of ice falling within the same ice falling time is inaccurate, and the amount of ice produced for the same drink is inaccurate, leading to problems in beverage quality control; and there may be errors in the different ice falling times designed for different amounts of falling ice, and it is not a linear relationship. Therefore, adjusting the amount of falling ice according to the time may lead to a large error.

SUMMARY

In order to solve the above problems, the present application provides an ice making machine with an ice cube weighing function.

The ice making machine with the ice cube weighing function provided by the present application adopts the following technical solution:

An ice making machine, having an ice cube weighing function, and comprising an ice making machine body, wherein an ice storage bucket for storing shaped ice cubes is provided in the ice making machine body, an ice outlet is provided on a side of the bottom of the ice storage bucket, and an electromagnetic valve is provided at the ice outlet and configured to control falling of ice cubes; the ice making machine body is provided with an ice discharging control mechanism below the ice outlet; the ice discharging control mechanism is electrically connected to the electromagnetic valve; the ice discharging control mechanism comprises a receiving funnel and the scale; a side wall of the receiving funnel is connected to the scale; a top inlet of a cavity of the receiving funnel is located directly below the ice outlet, and an ice falling controller is provided at a bottom outlet of the cavity of the receiving funnel and configured to control falling of ice cubes in the receiving funnel; and the ice falling controller is electrically connected to the scale.

Further, the scale comprises a supporting frame and a load cell, the supporting frame is connected to an inner wall of a box of the ice making machine body, a wire outlet end of the load cell is detachably fixed and installed on the supporting frame, and a force-bearing end of the load cell is connected to the side wall of the receiving funnel.

Further, the ice falling controller comprises a flip plate, a stepper motor and a limiting rod, the flip plate is hingedly connected to a side of the bottom outlet of the receiving funnel, the stepper motor is connected to the same side of the side wall of the receiving funnel, and a top end of the limiting rod is connected to an output end of the stepper motor, and a bottom end of the limiting rod is bent toward a side of the flip plate to fit the flip plate.

Further, a pressure equalizing block is connected to a bottom end of the limiting rod, and an outer side surface of the pressure equalizing block is connected with a cushion block.

Further, a bottom surface of the receiving funnel has a slope of 50° to 70°.

Further, a front shell of the ice making machine body is provided with an ice dispensing groove below the ice discharging control mechanism, a secondary funnel is inserted through and connected to the top of the ice dispensing groove, and a top inlet of the secondary funnel is located directly below the outlet of the receiving funnel.

In summary, the present application comprises at least one of the following beneficial technical effects:

(1) In the present application, the ice discharging control mechanism is provided below the ice outlet, the scale is used to weigh the ice cubes falling into the receiving funnel, and when ice cubes meet a weight standard, the ice falling controller controls the final falling of the ice cubes, so that the accurate and quantitative acquisition and use of ice cubes are achieved, and the practical applicability of the equipment is greatly improved.

(2) The flip plate is provided at the bottom of the receiving funnel, so that when the ice cubes at the bottom outlet of the receiving funnel are blocked, the stepper motor can be controlled to drive the limiting rod to rotate repeatedly, and then the flip plate is driven to tap the bottom of the receiving funnel, shaking the ice cubes down by vibration to ensure the smoothness of the ice falling.

Figure 1:
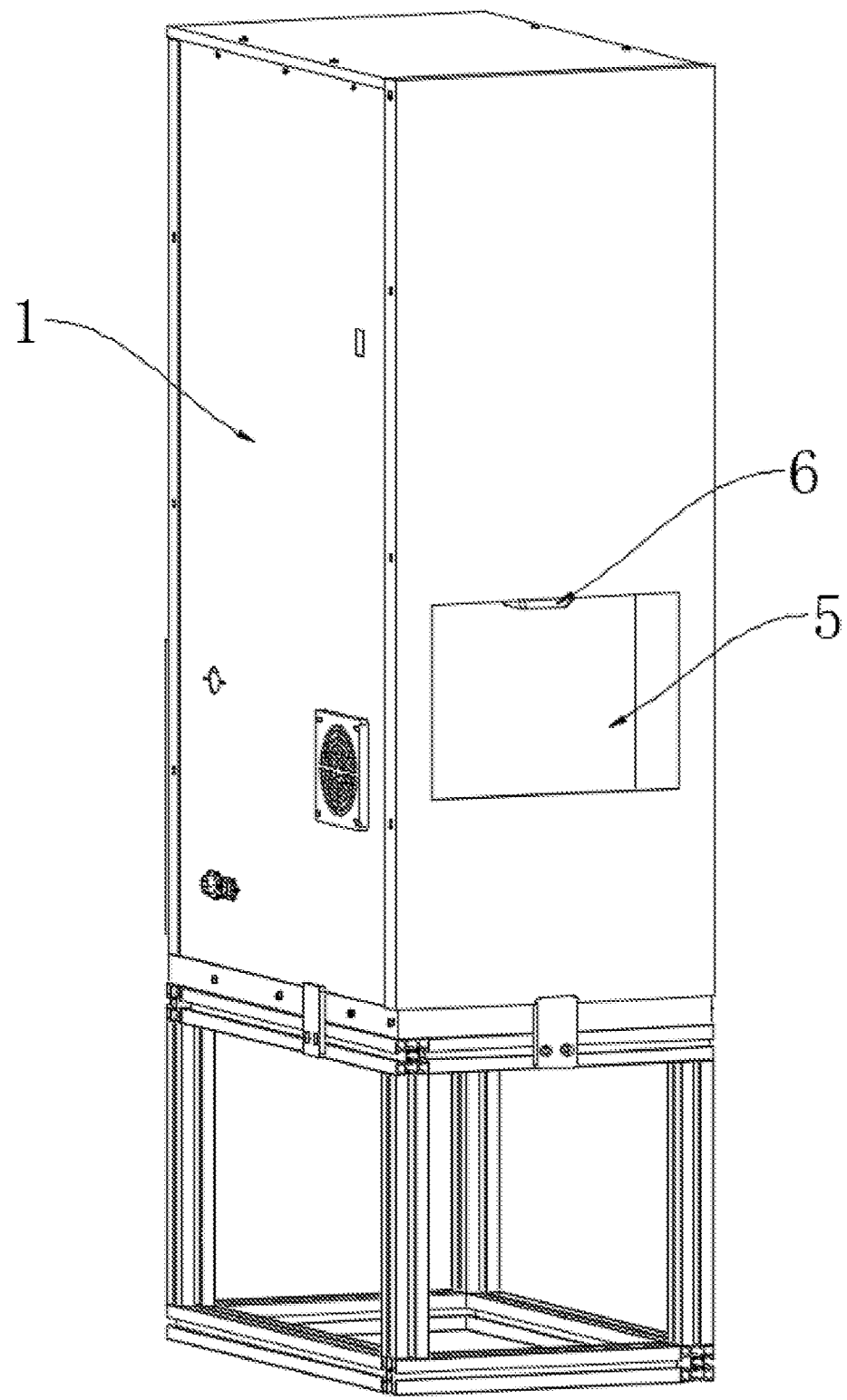
FIG. 1 is a schematic view of an overall structure of the present application.

Description of reference signs in the figures: 1. ice making machine body; 2. ice storage bucket; 3. ice outlet; 31. electromagnetic valve; 4. ice discharging control mechanism; 41. receiving funnel; 42. scale; 421. supporting frame; 422. load cell; 43. ice falling controller; 431. flip plate; 432. stepper motor; 433. Limiting rod; 434. pressure equalizing block; 435. cushion block; 5. ice dispensing groove; and 6. secondary funnel.

DETAILED DESCRIPTION

In the description of the present application, it should be noted that the orientations or positional relationships indicated by the terms such as "upper", "lower", "inner", "outer", and "top/bottom end" are based on the orientations or positional relationships shown in the drawings, which is only for the purpose of facilitating the description of the present application and simplifying the description, rather than indicating or implying that the device or element referred to must have a specific orientation, and construct and operate in a specific orientation. Therefore, these cannot be understood as a limitation of the present application. In addition, the terms "first" and "second" are only used for descriptive purposes, and cannot be understood as the indication or implication of relative importance.

In the description of the present application, it should be noted that unless otherwise clearly specified and limited, the terms such as "mounted", "provided with", "sleeved/sheathed" and "connected" should be understood in a broad sense. For example, "connected" may be a fixed connection, or may be a detachable connection, or may be an integral connection; it may be a mechanical connection, or may be an electrical connection; and it may be directly connected, or may be indirectly connected through an intermediate medium, or may be an internal communication of two elements. For those of ordinary skill in the art, the specific meanings of the aforementioned terms in the present application can be understood according to specific situations.

Embodiment 1

The present application will be further described in detail below with reference to FIGS. 1-3.

The embodiment of the present application discloses an ice making machine having an ice cube weighing function. The ice making machine includes an ice making machine body 1. An ice storage bucket 2 for storing shaped ice cubes is provided in the ice making machine body 1. An ice outlet 3 is provided on a side of the bottom of the ice storage bucket 2. An electromagnetic valve 31 is provided at the ice outlet 3 and configured to control falling of ice cubes. The ice making machine body 1 is provided with an ice discharging control mechanism 4 below the ice outlet 3. The ice discharging control mechanism 4 is electrically connected to the electromagnetic valve 31. The ice discharging control mechanism 4 comprises a receiving funnel 41 and the scale 42. A side wall of the receiving funnel 41 is fixedly connected to the scale 42. A top inlet of a cavity of the receiving funnel is located directly below the ice outlet 3, and an ice falling controller 43 is provided at a bottom outlet of the cavity of the receiving funnel and configured to control falling of ice cubes in the receiving funnel 41. The ice falling controller 43 is electrically connected to the scale 42.

Figure 2:
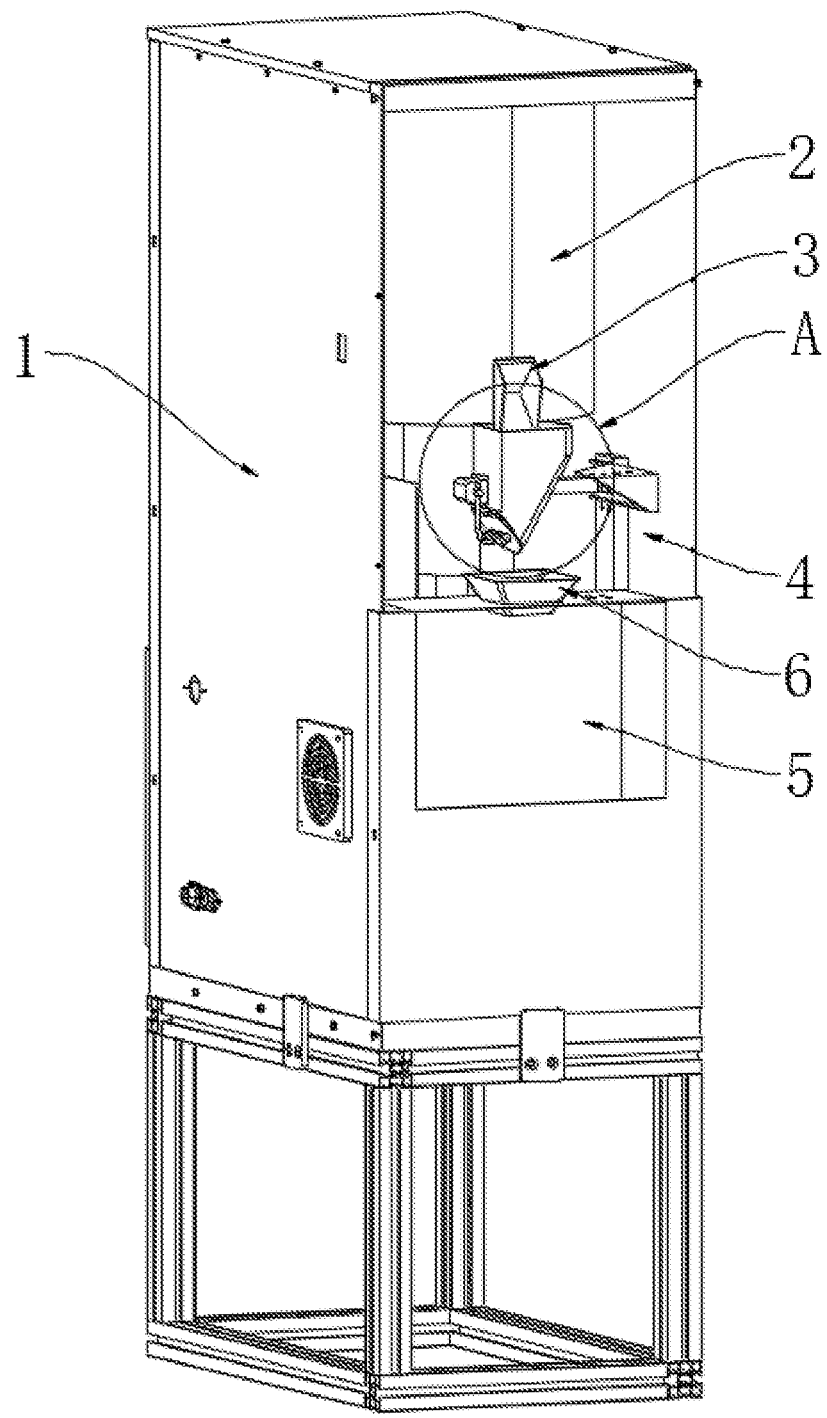
FIG. 2 is a schematic view of an internal structure of the present application.
Figure 3:
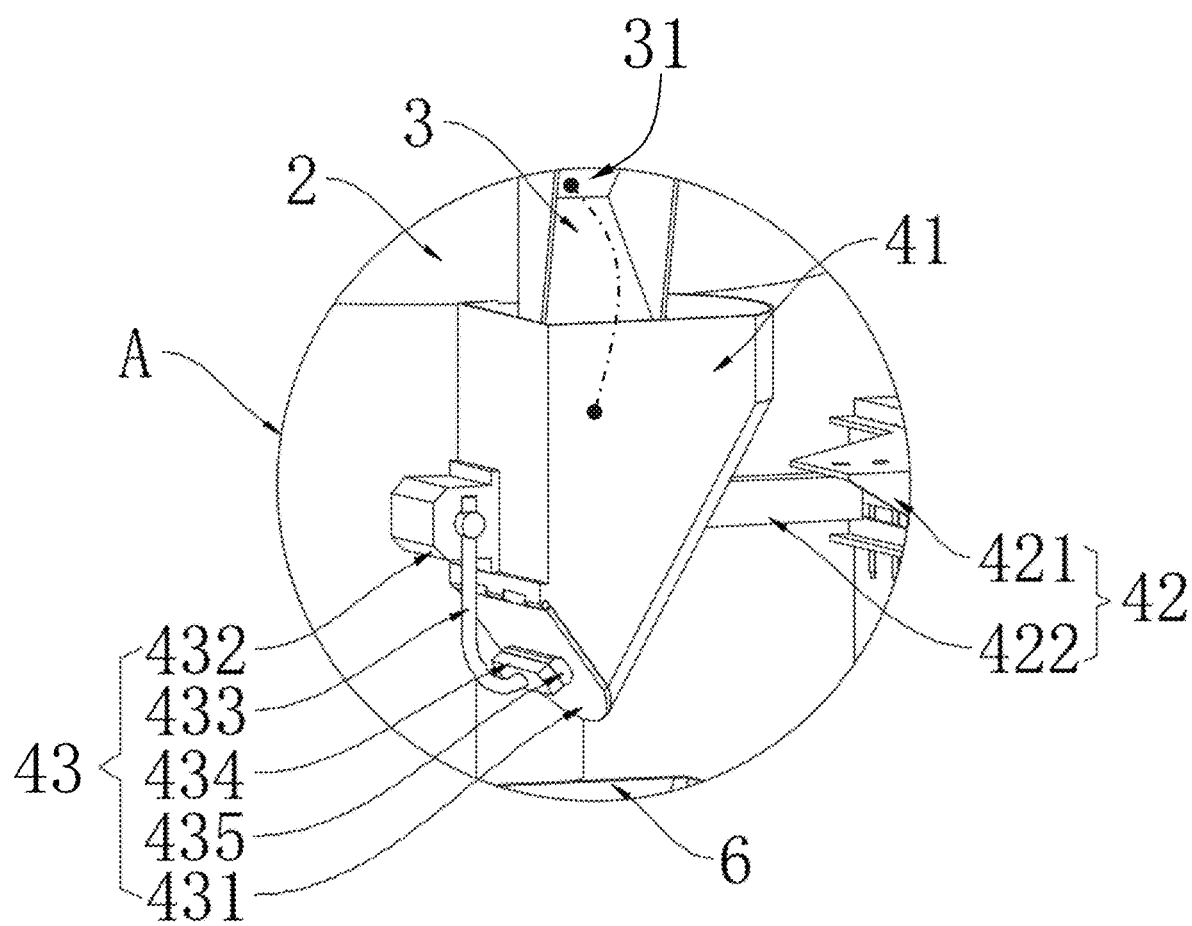
FIG. 3 is an enlarged view of portion A in FIG. 2.

With reference to FIGS. 2 and 3, the scale 42 includes a supporting frame 421 and a load cell 422. The supporting frame 421 is connected to an inner wall of a box of the ice making machine body 1. A wire outlet end of the load cell 422 is detachably fixed and installed on the supporting frame 421, and a force-bearing end of the load cell is connected to the side wall of the receiving funnel 41. The load cell 422 may weigh the overall weight of the receiving funnel 41 and the ice cubes falling into its cavity, and send electrical signals to the solenoid valve and the ice falling controller 43.

With reference to FIGS. 2 and 3, the ice falling controller 43 includes a flip plate 431, a stepper motor 432 and a limiting rod 433. The flip plate 431 is hingedly connected to a side of the bottom outlet of the receiving funnel 41. The stepper motor 432 is connected to the same side of the side wall of the receiving funnel 41. A top end of the limiting rod 433 is connected to an output end of the stepper motor 432, and a bottom end of the limiting rod is bent toward a side of the flip plate 431 to fit the flip plate. By controlling the operation of the stepper motor 432 to drive the limiting rod 433 to rotate, the rotation of the flip plate 431 is limited.

With reference to FIG. 3, a pressure equalizing block 434 connected to a bottom end of the limiting rod 433, and an outer side surface of the pressure equalizing block 434 is connected with a cushion block 435. The cushion block 435 can be made of flexible material such as rubber, silicone or foam, which avoids scratches on the flip plate 431 caused by rigid contact and also makes the stress distribution at the contact point more uniform.

As a further preference of this embodiment, the slope of the bottom surface of the receiving funnel 41 is 60°, which makes the falling of ice cubes more smoothly while ensuring a certain amount of ice storage.

With reference to FIGS. 1 and 2, a front shell of the ice making machine body 1 is provided with an ice dispensing groove 5 below the ice discharging control mechanism 4, a secondary funnel 6 is inserted through and connected to the top of the ice dispensing groove 5, and a top inlet of the secondary funnel 6 is located directly below the outlet of the receiving funnel 41.

The implementation principle of the ice making machine with the ice weighing function in the embodiment of the present application is as follows: when in use, the solenoid valve at the ice outlet 3 of the ice storage bucket 2 is opened, and ice cubes first fall into the receiving funnel 41. At this time, the load cell 422 weighs the ice cubes. When the weight of fallen ice reaches a set threshold, an electrical signal is triggered to the electromagnetic valve 31 so that the electromagnetic valve 31 is closed, while an electrical signal is triggered to the stepper motor 432 so that the stepper motor operates to drive the limiting rod 433 to rotate outward, releasing the limit on the flip plate 431. The ice cubes in the receiving funnel 41 fall from the outlet into the secondary funnel 6, and then fall out of the ice making machine from the ice dispensing groove 5, thereby completing the quantitative acquisition and use of ice cubes. Further, if the ice cubes in the receiving funnel 41 are stuck inside the cavity and cannot fall, the load cell 422 can still detect the weight information at this time and can send an electrical signal to control the stepper motor 432 to operate and drive the limiting rod 433 to rotate repeatedly, thereby causing the flip plate 431 to tap the bottom of the receiving funnel 41, and shaking the ice cubes down by vibration, which can effectively prevent blockage at the outlet, further improving the practical applicability of the equipment.

What is claimed is:

1. An ice making machine, comprising an ice making machine body, an ice storage bucket, an ice outlet on a side of a bottom of the ice storage bucket, and an electromagnetic valve at the ice outlet and configured to control falling of ice cubes;

wherein the ice making machine body comprises an ice discharging control mechanism below the ice outlet, wherein the ice discharging control mechanism is electrically connected to the electromagnetic valve, wherein the ice discharging control mechanism comprises a receiving funnel and a scale, wherein a side wall of the receiving funnel is connected to the scale, wherein a top inlet of a cavity of the receiving funnel is directly below the ice outlet, and wherein the ice making machine further comprises an ice falling controller at a bottom outlet of the cavity of the receiving funnel and configured to control falling of ice cubes in the receiving funnel, and the ice falling controller is electrically connected to the scale.

2. The ice making machine according to claim 1, wherein the scale comprises a supporting frame and a load cell, wherein the supporting frame is connected to an inner wall of a box of the ice making machine body, wherein a wire outlet end of the load cell is detachably connected to the supporting frame, and wherein a force-bearing end of the load cell is connected to the side wall of the receiving funnel.

3. The ice making machine according to claim 1, wherein the ice falling controller comprises a flip plate, wherein a stepper motor and a limiting rod,
wherein the flip plate is hingedly connected to a side of the bottom outlet of the receiving funnel,
wherein the stepper motor is connected to the same side of the side wall of the receiving funnel, and
wherein a top end of the limiting rod is connected to an output end of the stepper motor, and a bottom end of the limiting rod is bent toward a side of the flip plate to fit the flip plate.

4. The ice making machine according to claim 3, wherein a pressure equalizing block is connected to a bottom end of the limiting rod, and an outer side surface of the pressure equalizing block is connected with a cushion block.

5. The ice making machine according to claim 1, wherein a bottom surface of the receiving funnel has a slope of 50° to 70°.

6. The ice making machine according to claim 1, wherein a front shell of the ice making machine body comprises an ice dispensing groove below the ice discharging control mechanism, wherein a secondary funnel is inserted through and connected to a of the ice dispensing groove, and wherein a top inlet of the secondary funnel is directly below an outlet of the receiving funnel.

\* \* \* \* \*